(12) United States Patent
Mo et al.

(10) Patent No.: US 6,775,229 B1
(45) Date of Patent: Aug. 10, 2004

(54) METHOD AND SYSTEM FOR PROVIDING A PROTECTION PATH FOR CONNECTION-ORIENTED SIGNALS IN A TELECOMMUNICATIONS NETWORK

(75) Inventors: Li Mo, Plano, TX (US); Indra Widjaja, Nanuet, NY (US); Edward T. Sullivan, Highland Village, TX (US); David W. Wynn, Garland, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 620 days.

(21) Appl. No.: 09/588,634

(22) Filed: Jun. 6, 2000

Related U.S. Application Data (60) Provisional application No. 60/202,190, filed on May 5, 2000.

(51) Int. Cl.⁷ .......................... H04J 3/14; G01R 31/08
(52) U.S. Cl. ................... 370/220; 370/244; 370/252; 370/255
(58) Field of Search ................. 370/216–228, 370/241–246, 248–250, 252, 254, 255, 351

(56) References Cited

U.S. PATENT DOCUMENTS

| | | | |
|---|---|---|---|
| 5,229,990 A | 7/1993 | Teraslinna | 370/60 |
| 5,231,633 A | 7/1993 | Hluchyj et al. | 370/94.1 |
| 5,461,624 A | 10/1995 | Mazzola | 370/85.13 |
| 5,590,133 A | 12/1996 | Billstrom et al. | 370/349 |
| 5,771,370 A | 6/1998 | Klein | |
| 5,781,534 A | 7/1998 | Perlman et al. | 370/248 |
| 5,793,745 A * | 8/1998 | Manchester | 370/224 |
| 5,818,842 A | 10/1998 | Burwell et al. | 370/397 |
| 5,825,772 A | 10/1998 | Dobbins et al. | 370/396 |
| 5,850,399 A | 12/1998 | Ganmukhi et al. | 370/412 |
| 5,852,606 A | 12/1998 | Prince et al. | 370/393 |
| 5,946,308 A | 8/1999 | Dobbins et al. | 370/392 |
| 5,956,341 A | 9/1999 | Galand et al. | 370/412 |
| 6,018,766 A | 1/2000 | Samuel et al. | 709/218 |

(List continued on next page.)

FOREIGN PATENT DOCUMENTS

| | | | |
|---|---|---|---|
| EP | 0 512 495 A2 | 11/1992 | H04L/12/56 |
| EP | 0 849 970 A2 | 6/1998 | H04Q/11/04 |
| EP | 0 959 641 A1 | 11/1999 | H04Q/11/04 |

(List continued on next page.)

OTHER PUBLICATIONS

Form PCT/IPEA/416, *Notification of Transmittal of International Preliminary Examination Report*, with attached Form PCT/IPEA/409, *PCT International Preliminary Examination Report* (5 pages), for PCT/US01/13694 dated Mar. 19, 2003.

(List continued on next page.)

*Primary Examiner*—Hassan Kizou
*Assistant Examiner*—Ahmed Elallam
(74) *Attorney, Agent, or Firm*—Baker Botts L.L.P.

(57) ABSTRACT

A system is provided for providing a protection path for connection-oriented signals in a telecommunications network comprising a plurality of nodes. The system includes a source node, a destination node and a penultimate node. The source node is operable to transmit traffic. The destination node is operable to receive traffic from the source node. The penultimate node is operable to receive traffic from the source node, to transmit traffic directly to the destination node, to designate one of the nodes as a reflector and to generate a first segment of a protection path from the penultimate node through the reflector to the destination node.

25 Claims, 3 Drawing Sheets

U.S. PATENT DOCUMENTS

| | | | | |
|---|---|---|---|---|
| 6,028,842 | A | | 2/2000 | Chapman et al. ........... 370/235 |
| 6,047,331 | A | * | 4/2000 | Medard et al. ............. 709/239 |
| 6,058,113 | A | | 5/2000 | Chang ........................ 370/390 |
| 6,075,767 | A | | 6/2000 | Sakamoto et al. .......... 370/228 |
| 6,144,633 | A | * | 11/2000 | Ikeda et al. ................. 370/217 |
| 6,205,158 | B1 | | 3/2001 | Martin et al. ............... 370/541 |
| 6,317,426 | B1 | | 11/2001 | Afanador et al. ........... 370/352 |
| 6,331,905 | B1 | | 12/2001 | Ellinas et al. ............... 359/110 |
| 6,353,593 | B1 | | 3/2002 | Chen et al. .................. 370/216 |
| 6,353,616 | B1 | | 3/2002 | Elwalid et al. ............. 370/443 |
| 6,359,857 | B1 | | 3/2002 | Ahmad et al. .............. 370/217 |
| 6,366,556 | B1 | | 4/2002 | Ballintine et al. .......... 370/216 |
| 6,426,941 | B1 | * | 7/2002 | Vaman et al. ............... 370/228 |
| 6,515,966 | B1 | | 2/2003 | Bardalai et al. ............ 370/236 |
| 2001/0025310 | A1 | | 9/2001 | Krishnamurthy et al. ... 709/223 |

FOREIGN PATENT DOCUMENTS

| | | | |
|---|---|---|---|
| WO | WO 97/40610 | 10/1997 | ........... H04L/29/06 |
| WO | WO 98/00954 | 1/1998 | ........... H04L/29/06 |
| WO | WO 9/11090 | 3/1999 | ........... H04Q/11/04 |
| WO | WO 99/66675 | 12/1999 | ........... H04L/12/46 |
| WO | WO 00/10357 | 2/2000 | ........... H04Q/7/38 |
| WO | WO 00/21254 | 4/2000 | ........... H04L/12/56 |
| WO | WO 00/24164 | 4/2000 | ........... H04L/12/56 |

OTHER PUBLICATIONS

International Preliminary Examination Report in International Application No. PCT/US01/13695, dated Oct. 30, 2002, 4 pages.

International Preliminary Examination Report in International Application No. PCT/US01/13732, dated Jul. 12, 2002, 5 pages.

International Preliminary Examination Report in International Application No. PCT/US01/13725, dated Jun. 4, 2002, 5 pages.

Law A M et al: "Simulation Software for Communications Networks: The State of the Art," IEEE Communications Magazine, IEEE Service Center. Piscataway, N.J., US, vol. 32, No. 3, Mar. 1, 1994, p. 1, col. 2, line 4–p. 2, col. 1, line 39, p. 4, col. 1, line 3–p. 6, col. 1, paragraph 6; XP 000442186.

International Search Report in International Application No. PCT/US01/14615, dated Apr. 5, 2002, 7 pages.

PCT International Search Report No. PCT/US01/13724, dated Nov. 30, 2001, 6 pages, Nov. 30, 2000.

Birman A et al.: "Support for RSVP–Based Services Over ATM Networks," Communications: The Key to Global Prosperity. Globecom 1996. Global Internet 96 Conference Record. London, Nov. 18–22, 1996, Global Telecommunications Conference (Globecom, New York, IEEE, US, vol. SUPP, Nov. 18, 1996 pp. 10–15, XP000741665 ISBN: 0–7803–3337–3.

Sharma et al.: "Scalable timers for soft state protocols," Infocom '97. Sixteenth Annual Joint Conference of the IEEE Computer and Communications Societies. Driving the Information Revolution., Proceedings IEEE Kobe, Japan Apr. 7–11, 1997, Los Alamitos, CA USA, IEEE Comptu. Soc, Apr. 7, 1997, pp. 222–229, XP010252006, ISBN: 0–8186–7780–5.

International Search Report in International Application. No. PCT/US01/14626, dated Feb. 5, 2002, 7 pages.

International Search Report in International Application No. PCT/US01/14622, dated Feb. 14, 2002, 7 pages.

Pancha P: "ATM Switch Routers for Combined Connection–Oriented and Connectionless Transport," ISS '97. World Telecommunications Congress. (Int'l Switching Symposium). Global Network Evolution: Convergence or Collision? Toronto, Sep. 21–26, 1997, ISS. World Telecommunications Congress. (International Switching Symposium).

Mysore J. P. et al.: "Performance of transport protocols over a multicasting–based architecture fr Internet host mobility" Communications, 1998. ICC 98. Conference Record. 1998 IEEE International Conference on Atlanta, GA, USA Jun. 7–11, 1998, New York, NY USA, IEEE, US, Jun. 7, 1998, pp. 1817–1823, XP010284635, ISBN: 0–7803–4788–9.

Bar–Noy A. et al.: "Topology Distribution Cost Vs. Efficient Routing in Large Networks," Computer Communications Review, Association for Computing Machinery, New York, US, vol. 20, No. 4, Sep. 1, 1990, pp. 242–252, XP000168058; ISSN: 0146–4833, whole document.

International Search Report in International Application No. PCT/US01/13694, dated Mar. 12, 2002, 7 pgs.

Fritz J: "Bullet Proofing ATM: Part I," Byte, McGraw–Hill Inc. St. Peterboroug, US, vol. 22, No. 6, Jun. 1, 1997, pp. 59–60, XP000691556, ISSN: 0360–5280, p. 60.

Sun H. et al.: "Supporting IP on the ATM networks: an overview," Computer Communications, Elsevier Science Publishers BV, Amsterdam, NL, vol. 21, No. 11, Aug. 10, 1998, pp. 1020–1029, XP004138773, ISSN: 1040–3664, whole document.

International Search Report in International Application No. PCT/US 01/13723, dated Oct. 31, 2001, 7 pages.

International Search Report in International Application No. PCT/US 01/13725, dated Oct. 31, 2001, 6 pages.

International Search Report in International Application No. PCT/US 01/14624, dated Nov. 6, 2001, 6 pages, Nov. 11, 2001.

PCT Invitation to Pay Additional Fees in International Application No. PCT/US 01/13732, dated Nov. 7, 2001, 4 pages.

Tsong–Ho Wu, "A Passive Protected Self–Healing Mesh Network Architecture and Applications," *IEEE/ACM Transactions on Networking*, XP 000446089, Feb. 1994, 13 pages.

PCT International Search Report in International Application No. PCT/US 01/13695, dated Oct. 9, 2001, 6 pages.

Kermani, et al., "*Virtual Cut–through: A New Computer Communication Switching Technique*", Computer Networks, vol. 3, Cover, Table of Contents and pp. 267–285, 1979.

Cidon, et al., "*MetaRing—A Full Duplex Ring with Fairness and Spatial Reuse*", IEEE Transactions on Communications, vol. 41, Cover and pp. 110–120, Jan. 1993.

Ofek, et al., "*METANET: Principles of an Arbitrary Topology LAN*", IEEE Transactions on Networking, vol. 3, No. 2, Cover and pp. 169–180, Apr. 1995.

West, "*Introduction to Graph Theory*", Prentice Hall, ISBN 0–13–227828–6, QA166.W43 1996, 7 pages Cover, ISBN page, Table of Contents, and pp. 51–85, 1996.

Hunter, et al., "*WASPNET: A Wavelength Switched Packet Network*", IEEE Communications Magazine, 2–page cover and pp. 120–129, Mar. 1999.

Hernandez–Valencia, "*A Simple Data Link (SDL) Framing Protocol for High–Speed Optical Packet Networks*", OIF99.043.0, pp. 1–21, May 4, 1999.

Simpson, "*The Point–to–Point Protocol (PPP)*", Daydreamer, RFC–1661, 50 pages, Jul. 1994.

Katz, et al., "*Traffic Engineering Extensions to OSPF*", IETF Draft, draft–katz–yeung–ospf–traffic–01.txt, pp. 1–8, Oct. 1999.

Crawley, et al., "*A Framework for Qos Based Routing in the Internet*", RFC 2386, 35 pages, Aug. 1998.

Wimer, et al., FORE Systems, Inc.,"*OSPF Sub–Areas*", IETF Draft, draft–wimer–ospf–sub–areas–00.txt, 13 pages, Oct. 1999.

Wimer, et al., FORE Systems, Inc., "*Additional OSPF Extensions for Traffic Engineering and Qos Routing*", IETF Draft, draft–wimer–ospf–traffic–00.txt, 5 pages, Feb. 1999.

Yeung, "*OSPF Extensions for Traffic Engineering*", IETF Draft, draft–yeung–ospf–traffic–00.txt, 9 pages, Feb. 1999.

Apostolopoulos, et al., "*Qos Routing Mechanism and OSPF Extensions*", RFC 2676, 47 pages, Aug. 1998.

Smit, et al., "*IS–IS Extensions for Traffic Engineering*", IETF Draft, draft–ietf–isis–traffic–00.txt, 10 pages, May 1999.

Awduche, et al., UUNET (MCI WorldCom), "*Requirements for Traffic Engineering Over MPLS*", RFC 2702, 28 pages, Sep. 1999.

Blake, et al., "*An Architecture for Differentiated Services*", RFC 2475, 34 pages, Dec. 1998.

Braden, et al., "*Resource ReSerVation Protocol (RSVP)*", Version 1 Functional Specification, RFC 2205, 105 pages, Sep. 1997.

Wroclawski, "*Specification of the Controlled–Load Network Element Service*", RFC 2211, 18 pages, Sep. 1997.

Shenker, et al., "*Specification of Guaranteed Quality of Service*", RFC 2212, 19 pages, Sep. 1997.

Reynolds, et al., ISI, "*Assigned Numbers*", RFC 1700, 215 pages, Oct. 1994.

Jacobson, et al., "*An Expedited Forwarding PHB*", RFC 2598, 11 pages, Jun. 1999.

Heinanen, et al., "*Assured Forwarding PHB Group*", RFC 2597, 11 pages, Jun. 1999.

Manchester, et al., Bell Laboratories, "*IP over SONET*", IEEE Communications Magazine, vol. 36, No. 5, cover and pp. 136–142, May 1998.

Heinanen, Telecom Finland "*Multi–Protocol Encapsulation over ATM Adaptation Layer 5*", RFC 1483, 15 pages, Jul. 1993.

The ATM Forum, Technical Committee, "*Private Network–Network Interface Specification Version 1.0*", af–pnni–0055.000, cover, introduction, acknowledgements and table of contents (18 pages) and 366 pages of text, Mar. 1996.

Callon, Digital Equipment Corporation, "*Use of OSI IS–IS for Routing in TCP/IP and Dual Environments*", RFC 1195, 80 pages, Dec. 1990.

Moy, Ascend Communications "*OSPF Version 2*", RFC 2328, 204 pages, Apr. 1998.

Malkin, Bay Networks, "*RIP Version 2*", RFC 2453, 37 pages, Nov. 1998.

Rekhter, et al., "*A Border Gateway Protocol 4 (BGP–4)*", RFC 1771, 54 pages, Mar. 1995.

Goguen, et al., "*RSVP Label Allocation for Backup Tunnels*", draft–swallow–rsvp–bypass–label–00.txt, IETF Document, 10 pages, Oct. 1999.

Callon, et al., "*A Framework for MPLS*", draft–ietf–mpls–framework–05.txt, IETF document, 69 pages, Sep. 1999.

Rosen, et al., "*Multiprotocol Label Switching Architecture*", draft–ietf–mpls–arch–06.txt, IETF Document, 62 pages, Feb. 1999.

Rosen, et al., "*MPLS Label Stack Encoding*", IETF document, draft–ietf–mpls–label–encaps–07.txt, 22 pages, Sep. 1999.

Andersson, et al., "*LDP Specification*", IETF document, draft–ietf–mpls–ldp–06.txt, 124 pages, Oct. 1999.

Jamoussi, Nortel Networks Corp., "*Constraint–Based LSP Setup Using LDP*", draft–ietf–mpls–cr–ldp–03.txt, IETF Document, pp. 1–39, Sep. 1999.

Guerin, "*Qos Routing in Networks with Inaccurate Information: Theory and Algorithms*", IEEE/ACM Transactions on Networking, vol. 7, No. 3, cover and pp. 350–364, Jun. 1999.

Parekh, et al., "*A Generalized Processor Sharing Approach to Flow Control in Integrated Services Networks: The Single Node Case*", IEEE Transactions on Networking, vol. 1, No. 3, cover and pp. 344–357, Jun. 1993.

Parekh, et al., "*A Generalized Processor Sharing Approach to Flow Control in Integrated Services Networks: The Multiple Node Case*", IEEE Transactions on Networking, vol. 2, No. 2, cover and pp. 137–150, Apr. 1994.

Zhang, "*Virtual Clock: A New Traffic Control Algorithm for Packet Switching Networks*", ACM SIGCOMM Computer Communication Reviews, vol. 20, No. 4, pp. 19–29, Sep. 1990.

Ferrari, et al., "*A Scheme for Real–Time Channel Establishment in Wide–Area Networks*", IEEE Journal on Selected Areas in Communications, vol. 8, No. 3, cover and pp. 368–379, Apr. 1990.

Wrege, et al., "*A Near–Optimal Packet Scheduler for QoS Networks*", Proceedings of IEEE Infocom '97, Kobe, Japan, cover and pp. 576–583, Apr. 7–12, 1997.

Golestani, "*A Stop–and–Go Queuing Framework for Congestion Management*", ACM SIGCOMM Computer Communications Review, vol. 20, No. 4., pp. 8–18, Sep. 1990.

Kalmanek, et al., "*Rate Controlled Servers for Very High–Speed Networks*", Proceedings of IEEE Globecom '90, San Diego, CA, Conference Record vol. 1 of 3, cover and pp. 300.3.1–300.3.9, Dec. 2–5, 1990.

Sriram, K., "*Methodologies for Bandwidth Allocation, Transmission, Scheduling and Congestion Avoidance in Broadband, ATM Networks*", Proceedings of IEEE Globecom, '92, Orlando, FL, Conference Record vol. 3 of 3, cover and pp. 1545–1551, Dec. 6–9, 1992.

Jacobson, et al., "*Random Early Detection Gateways for Congestion Avoidance*", ACM/IEEE Transactions on Networking, vol. 1, No. 4, cover and pp. 397–413, Aug. 1993.

Braden, et al., "*Recommendations on Queue Management and Congestion Avoidance in the Internet*", RFC 2309, 16 pages, Apr. 1998.

Jacobson, "*Notes on Using RED for Queue Management and Congestion Avoidance*", Network Research Group, Berkeley National Laboratory, Berkeley, CA, NANOG 13, Dearborn, MI, cover and 15 pages, Jun. 8, 1998.

May, et al., "*Analytic Evaluation of RED Performance*", pp. 1–10, Jun. 1998.

May, et al., "*Reasons Not To Deploy RED*", pp. 1–5, May 1999.

Lakshman, et al., "*SRED: Stabilized RED*", pp. 1–10, Mar. 1999.

Feng, et al., "*BLUE: A New Class of Active Queue Management Algorithms*", pp. 1–27, Mar. 1999.

Cisco's "Distributed Weighted Random Early Detection", Source = http://www.cisco.com/univercdcc/td/doc/product/software/ios111/cc111/wred.htm#xtocid236360, 17 pages, Feb. 9, 1998.

J. Wroclawski, MIT LCS "The Use of RSVP with IETF Integrated Services", RFC 2210, 31 pages, Sep. 1997.

Shenker, et al., "General Characterization Parameters for Integrated Service Network Elements", RFC 2215, 15 pages, Sep. 1997.

Braden, et al., "RAPI—An RSVP Application Programming Interface, Version 5", Internet Draft, 25 pages, Aug. 11, 1998.

Katsube, et al., "Toshiba's Router Architecture Extensions for ATM: Overview", RFC 2098, 17 pages, Feb. 1997.

Rekhter, et al., "Cisco Systems' Tag Switching Architecture Overview", RFC 2105, 13 pages, Feb. 1997.

Viswanathan, et al., "ARIS: Aggregate Route–Based IP Switching", Internet draft, 19 pages, Mar. 1997.

Newman, et al., "Ipsilon Flow Management Protocol Specification for IPv4 Version 1.0", RFC 1953, 19 pages, May 1996.

Davie, et al., "Switching in IP Networks", ISBN 1–558650–505–3, TK5105.875.I57,D38, Morgan Kaufmann Publishers, Inc., San Francisco, CA, 8 pgs. cover, ISBN page, table of contents, pp. 27–55, 117–154, 219–232, 1998.

Moy, Proteon, Inc., "OSPF Version 2", RFC 1583, 202 pages, Mar. 1994.

Fuller, et al., "Classless Inter–Domain Routing (CIDR): An Address Assignment and Aggregation Strategy", RFC 1519, 23 pages, Sep. 1993.

Dumortier, "Toward a New IP over ATM Routing Paradigm", IEEE Communications Magazine, 2–page cover and pp. 82–86, Jan. 1998.

White, et al., "ATM Switching and IP Routing Integration: The Next Stage in Internet Evolution?", IEEE Communications Magazine, 2–page cover and pp. 79–83, Apr. 1998.

Viswanathan, et al., "Evolution of Multiprotocol Label Switching", IEEE Communications Magazine, 2–page cover and pp. 165–173, May 1998.

Laubach, "Classical IP and ARP over ATM", RFC 1577, 16 pages, Jan. 1993.

Callon, et al., "A Framework for Multiprotocol Label Switching", Internet–Draft, 65 pages, Nov. 1997.

Schmidt, et al., "Multiprotocol over ATM—Building State of the Art ATM Intranets", Manning Publications Co., ISBN 1–884777–42–2, TK5105.875.16S36, 8 pgs. cover, ISBN page, table of contents, and pp. 207–289, 1998.

Halabi, "Internet Routing Architecture", Cisco Systems, New Riders, Cisco Press, 6 pgs. cover, ISBN page table of contents, and pp. 87–190, 1997.

Finn, et al., "LAN Emulation over ATM Version 2.0– LUNI Specification", The ATM Forum Technical Committee, AF–LANE–0084.000, 153 pages, Jul. 1997.

Alexander, et al., "Multi–Protocol over ATM Version 1.0", AF–MPOA–0087.000, The ATM Forum Technical Committee, 154 pages, Jul. 1997.

Deering, Stanford University, "Host Extensions for IP Multicasting", STD 5, RFC 1112, 16 pages, Aug. 1989.

Sahinoglu, et al., "On Multimedia Networks: Self–Similar Traffic and Network Performance", IEEE Communications Magazine, vol. 37, No. 1, cover and pp. 48–52, Jan. 1999.

Fishburn, et al., "Dynamic Behavior of Differential Pricing and Quality of Service Options for the Internet", Proc. First Inter. Conf. on Information and Computation Economics (ICE–98), ACM Press, 1998, pp. 128–139, 1998.

Steinmetz, et al., "Multimedia: Comuting Communications and Applications", Prentice Hall, ISBN 0–13–324435–0, QA76.575.S73, cover, acknowledgment page, LOC page, Index (15 pgs) and pp. 420–450, 1995.

Gale, et al., "College Admissions and the Stability of Marriage", The American Mathematical Monthly, vol. 69, No. 1, cover and pp. 9–15, 1962.

McKeown, "Scheduling Algorithms for Input–Queued Cell Switches", Ph.D. Thesis, Univ. of California at Berkeley, UMI No. 9602658, 12 pages cover, introduction, acknowledgment and index pages, 119 pages text, 1995.

Simpson, Daydreamer, "PPP over SONET/SDH", RFC 1619, 6 pages, May 1994.

Simpson, Daydreamer, "Point–to–Point Protocol (PPP)", RFC 1661, 50 pages, Jul. 1994.

Simpson, Daydreamer, "PPP in HDLC–Like Framing", RFC 1662, 24 pages, Jul. 1994.

McCloghrie, et al., "Management Information Base for Network Management of TCP/IP–Based Internets: MIB–II", RFC 1213, 66 pages, Mar. 26, 1991.

Baker, et al., Cisco Systems, "OSPF Version 2 Management Information Base", RFC 1850, 75 pages, Nov. 1995.

Baker, et al., Cisco Systems, "RSVP Management Information Base Using SMIv2", RFC 2206, 60 pages, Sep. 1997.

Kastenholz, FTP Software, Inc., "The Definitions of Managed Objects for the Link Control Protocol of the Point–to–Point Protocol", RFC 1471, 24 pages, Jun. 1993.

Kastenholz, FTP Software, Inc., "The Definitions of Managed Objects for the IP Network Control Protocol of the Point–to–Point Protocol", RFC 1473, 10 pages, Jun. 1993.

Baker, Cisco Systems, "IP Forwarding Table MIB", RFC 2096 pages, Jan. 1997.

Awduche, et al., draft–ietf–tewg–framework–01.txt (IETF), "A Framework for Internet Traffic Engineering", 63 pages, Jul. 2000.

U.S. Patent Application Serial No. 09/589,038, entitled "Method and System for Providing a Protection Path for Connectionless Signals in a Telecommunications Network", inventors Mo, et al., 38 pages specification, claims and abstract and 9 pages of drawings (Attorney's Docket No. 064731.0142), Jun. 6, 2000.

U.S. Patent Application Serial No. 09/588,806, entitled "Transport Network and Method", inventors Mo, et al., 40 pages specification, claims and abstract and 9 pages of drawings (Attorney's Docket No. 064731.0143), Jun. 6, 2000.

U.S. Patent Application Serial No. 09/588,636, entitled "Method and System for Transporting Traffic in a Packet–Switched Network", inventors Mo, et al., 32 pages specification, claims and abstract and 6 pages of drawings (Attorney's Docket No. 064731.0144), Jun. 6, 2000.

U.S. Patent Application Ser. No. 09/588,632, entitled "System and Method Connectionless/Connection Oriented Signal Transport", inventors Mo, et al., 44 pages specification, claims and abstract and 7 pages of drawings (Attorney's Docket No. 064731.0145), Jun. 6, 2000.

U.S. Patent Application Serial No. 09/848,994, entitled "Method and System for Quality of Services (QoS) Support in a Packet–Switched Network", inventors Li Mo, et al., 35 pages specification, claims and abstract and 6 pages of drawings (Attorney's Docket No. 064731.0167), May 4, 2001.

U.S. Patent Application Serial No. 09/848,871, entitled "Method and System for Modeling and Advertising Asymmetric Topology of a Node in a Transport Network", inventors Jaber, et al., 35 pages specification, claims and abstracts and 10 pages of drawings (Attorney's Docket No. 064731.0169), May 4, 2001.

U.S. Patent Application Serial No. 09/849,003, entitled "Unique Address Space and Method for a Transport Network", inventor Edwin Alton Harbin, 36 pages specification, claims and abstract and 10 pages of drawings (Attorney's Docket No. 064731.0170), May 4, 2001.

U.S. Patent Application Serial No. 09/849,010, entitled "Method and System for Hardware Simulation", inventors Richard L. Klevans, et al., 28 pages specification, claims and abstract and 7 pages of drawings (Attorney's Docket No. 064731.0171), May 4, 2001.

* cited by examiner

METHOD AND SYSTEM FOR PROVIDING A PROTECTION PATH FOR CONNECTION-ORIENTED SIGNALS IN A TELECOMMUNICATIONS NETWORK

RELATED APPLICATIONS

This application claims the benefit of U.S. Provisional Application Serial No. 60/202,190, entitled INTERNET PROTOCOL TRANSPORT, filed May 5, 2000 which is hereby incorporated by reference.

TECHNICAL FIELD OF THE INVENTION

This invention relates generally to the field of telecommunications and more particularly to a method and system for providing a protection path for connection-oriented signals in a telecommunications network.

BACKGROUND OF THE INVENTION

Telecommunications systems generally operate in either a connection-oriented mode or a connectionless mode. In a connection-oriented mode of operation, signals are communicated over specified paths from a source network element to a destination network element. Connection-oriented signals include, for example, Multi-Protocol Label Switching signals with Asynchronous Transport Mode (ATM), frame relay, or packet-over-SONET encoding.

When a failure occurs along the specified working path in connection-oriented communication, the signals must be re-routed to the destination network element along another available path. Previous attempts to provide for the delivery of connection-oriented signals via an alternate route have included global repair, per-area repair and local repair.

For global repair, the node closest to the failure generates failure notification messages that are delivered to the source network element. The source network element then switches the signals to a protection path. Bandwidth is reserved on the protection path in an amount equal to the working path bandwidth.

Using a global repair scheme, however, may result in time limits for recovery being unmet due to long distances between the point of failure and the source network element. In addition, the node detecting the failure needs a way to send a reliable failure notification message to each source network element that is affected by the failure. Also, the failure notification message must be understood by the source network element. However, using global repair across different routing areas may prevent the source network elements from understanding the failure notification messages. Using global repair also results in the reservation of protection path bandwidth that prevents other traffic sources from using an optimal path, thereby reducing the total network efficiency.

For per-area repair, protection switching is isolated to a single area of network elements. However, this type of repair wastes bandwidth and results in an increased number of paths that must be maintained. In addition, per-area repair requires the use of two border nodes at every border between two different areas.

For local repair, protection switching is initiated by a node adjacent to the failure. Thus, for example, local repair schemes may include deflective routing. However, the use of local repair fails to provide for bandwidth reservation for general topologies to guarantee bandwidth for protected traffic.

SUMMARY OF THE INVENTION

In accordance with the present invention, a method and system for providing a protection path for connection-oriented signals in a telecommunications network are provided that substantially eliminate or reduce disadvantages and problems associated with previously developed systems and methods. In particular, reflectors are used to provide a plurality of segments for a protection path, thereby reducing overall packet delay and satisfying Quality of Service requirements.

In one embodiment of the present invention, a system is provided for providing a protection path for connection-oriented signals in a telecommunications network comprising a plurality of nodes. The system includes a source node, a destination node and a penultimate node. The source node is operable to transmit traffic. The destination node is operable to receive traffic from the source node. The penultimate node is operable to receive traffic from the source node, to transmit traffic directly to the destination node, to designate one of the nodes as a reflector and to generate a first segment of a protection path from the penultimate node through the reflector to the destination node.

In another embodiment of the present invention, a node is provided in a telecommunications network. The node includes an ingress port, a reflector identifier, a protection path generator, and an egress port. The ingress port is operable to receive traffic. The traffic comprises a working path, a protection path, working traffic and protection traffic. The reflector identifier is operable to identify the node as a reflector based on the received traffic. The protection path generator is operable to generate a protection path based on an identification of the node as a reflector. The egress port is operable to transmit traffic.

Technical advantages of the present invention include providing an improved method for providing a protection path for connection-oriented signals in a telecommunications network. In particular, a penultimate node in the working path designates a reflector and generates a segment of a protection path from the penultimate node through the reflector to the destination node. The reflector then generates another segment of the protection path. Accordingly, the protection path comprises a plurality of segments each operable to provide protection for a distinct protection domain. As a result, protection capability and flexibility is increased, protection switching delays are decreased, and network efficiency is improved.

Other technical advantages of the present invention include providing a method for generating a protection path for a packet-switched network. In particular, a plurality of segments making up a protection path are generated by nodes in the working path. As a result, a protection path is provided for a packet-switched network without the need for each node detecting a failure to generate failure notification messages for the source network element. In addition, network elements need not be partitioned into different protection areas.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
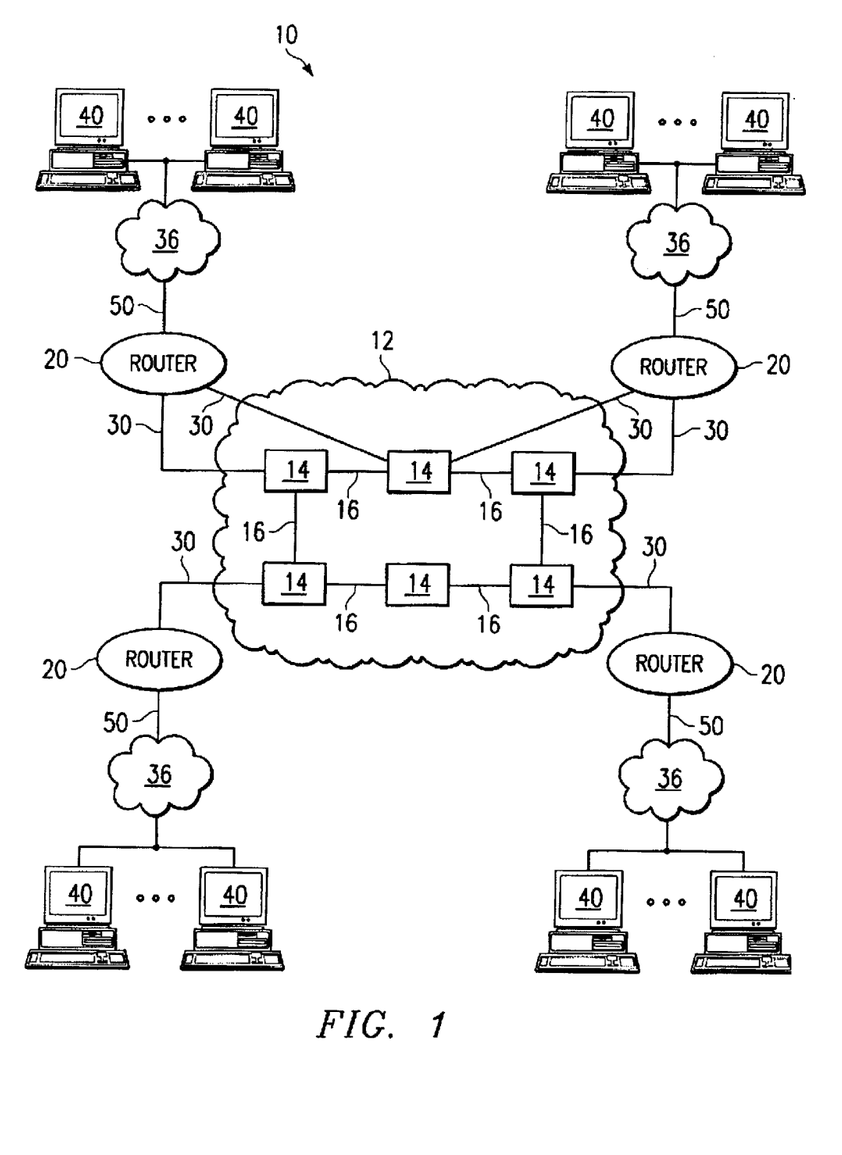
FIG. 1 is a block diagram illustrating a communication system operable to facilitate communication of connection-oriented signals in accordance with one embodiment of the present invention.

FIG. 1 is a block diagram illustrating a communication system 10 operable to facilitate communication of connection-oriented signals in accordance with one embodiment of the present invention. The telecommunications network is a network that transmits voice, audio, video or other suitable types of information, and/or a combination of different types of information between source and destination points. As used herein, the term "connection-oriented signal" refers to any signal associated with a particular path, or portion of a path, from a source network element to a destination network element. For example, connection-oriented signals include Multi-Protocol Label Switching (MPLS) signals with ATM, frame relay or packet-over-SONET encoding.

The system 10 is operable to provide either connection-oriented communication or a hybrid of connectionless and connection-oriented communication, as described in the co-owned U.S. patent application Ser. No. 09/588,632, entitled "System and Method for Connectionless/Connection Oriented Signal Transport," filed on Jun. 6, 2000 and currently pending. The system 10 comprises a core cloud 12 that comprises one or more core network elements 14, or nodes 14. The nodes 14 may communicate with each other via communication links 16 and with one or more peripheral network elements 20 via communication links 30. The communication links 16 and 30 may comprise any wireless, wireline, fiber or other communication medium or combinations of media. A signal communicated via communication links 16 and/or 30 may comprise an electrical signal, an optical signal, or any other suitable type of signal or combination of signals.

The peripheral network elements 20 facilitate communication between the core cloud 12 and other network elements coupled to other networks, such as networks 36. According to the illustrated embodiment, the peripheral network elements 20 comprise routers 20. Each router 20 couples the core cloud 12 to a network 36 via a communication link 50. As used herein, "each" means every one of at least a subset of the identified items.

The routers 20 facilitate routing functions for signals originated or forwarded by interface equipment 40 and communicated over the networks 36. The interface units 40 comprise personal computers, servers, switches, routers or any other suitable network equipment operable to originate or forward communication signals. In accordance with one embodiment, the interface units 40 operate to communicate MPLS signals with ATM, frame relay and/or packet-over-SONET encoding or any other suitable label-switched signals. It will be understood, however, that interface units 40 communicating other types of signals may be coupled to the networks 36 without departing from the scope of the present invention.

The networks 36 may comprise any suitable wireline or wireless systems that support communication between network elements using ground-based and/or space-based components. For example, the networks 36 may comprise public switched telephone networks, integrated services digital networks, local area networks, wide area networks, or any other suitable communication systems or combination of communications systems at one or more locations. Each of the networks 36 may comprise a single network or multiple networks.

In operation, the core cloud 12 receives connection-oriented signals from the peripheral network elements 20 and routes those signals through the core cloud 12 to another appropriate peripheral network element 20 according to routing rules associated with the received signal. In a particular embodiment, an ingress node 14 receives an incoming signal from a peripheral network element 20 and appends a transport label to the incoming signal which contains instructions or an index to instructions to other nodes 14 on how to process the signal.

The ingress node 14 identifies an egress node 14 associated with a destination peripheral network element 20 and communicates the signal toward the egress node 14. The nodes 14 residing between the ingress node and the egress node 14 receive the signal with the appended transport label and process the signal in accordance with the transport label.

Figure 2:
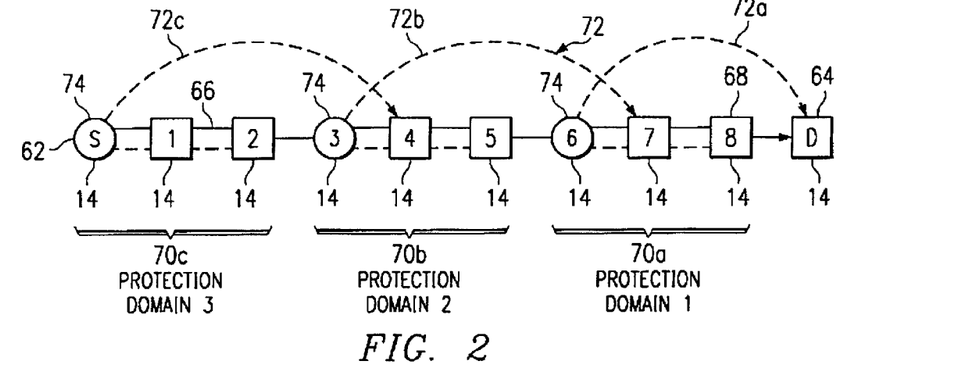
FIG. 2 is a block diagram illustrating a system for providing a protection path for connection-oriented signals communicated between the nodes of FIG. 1 in accordance with one embodiment of the present invention.

FIG. 2 is a block diagram illustrating a system 60 for providing a protection path for connection-oriented signals communicated between the nodes 14 in accordance with one embodiment of the present invention. According to one embodiment, a protection path comprises reserved bandwidth that is available for protection traffic. The system 60 comprises a plurality of nodes 14, including a source node 62 for transmitting traffic to a destination node 64 along a working path 66 that comprises a plurality of other nodes 14. In the illustrated embodiment, the nodes 14 are numerically labeled 1–8 for discussion purposes; however, it will be understood that any suitable number of nodes 14 may exist along the working path 66 between the source node 62 and the destination node 64. Thus, each node 14 may represent 0, 1 or more nodes 14.

The system 60 also comprises a penultimate node 68, which is the node 14 that is operable to transmit working traffic along the working path 66 directly to the destination node 64. As used herein, "directly" refers to communication from one node 14 to another node 14 with no intervening nodes 14 between them. Similarly, as used herein, "indirectly" refers to communication from one node 14 to another node 14 through one or more intervening nodes 14. In addition, two nodes 14 are coupled to each other when the nodes 14 are operable to communicate with each other either directly or indirectly. Once the working path 66 is established from the source node 62 to the destination node 64, the penultimate node 68 is operable to identify itself as the penultimate node 68 and to establish a protection domain 70a by generating a first segment 72a of a protection path 72.

The system 60 comprises a plurality of protection domains 70, each of which comprises a reflector 74 and one or more inner nodes 14. A reflector 74 comprises a node 14 that is operable to transmit protection traffic to a node 14 that is outside and downstream of the protection domain 70 comprising that reflector 74. Each reflector 74 may transmit protection traffic to the downstream node 14 either directly or indirectly; however, any intervening nodes 14 may not be within the protection domain 70 comprising the reflector 74. The inner nodes 14 are nodes 14 other than reflectors 74 and the destination node 64. Thus, in the illustrated embodiment, nodes one, two, four, five, seven and eight are inner nodes 14.

Each segment 72a, b or c of the protection path 72 begins at the most downstream node 14 in the corresponding protection domain 70a, b or c, continues upstream through the inner nodes 14 until arriving at the reflector 74, and ends at another node 14 outside and downstream of the protection domain 70a, b or c. Thus, each protection domain 70, other than the protection domain 70 comprising the source node 62, may receive working traffic from an upstream protection domain 70 through its own reflector 74 and may receive protection traffic from the reflector 74 for the upstream protection domain 70 through one of its own inner nodes 14.

As used herein, "upstream" refers to a node 14 that is closer to the source node 62 than the reference node 14. Similarly, as used herein, "downstream" refers to a node 14 that is closer to the destination node 64 than the reference node 14. In addition, although the illustrated embodiment comprises three protection domains 70a, b and c, it will be understood that the present invention may be implemented with any suitable number of protection domains 70.

The penultimate node 68 designates a node 14 as a reflector 74 for the first protection domain 70a and generates the first segment 72a of the protection path 72 by providing an order of nodes 14 corresponding to the path for protection traffic within the first protection domain 70a to each of those nodes 14. Thus, for the illustrated embodiment, the first segment 72a comprises node eight, followed by node seven, followed by node six and finally the destination node 64. This order of nodes 14 is provided by the penultimate node 68 to the ordered nodes 14.

A node 14 is designated as a reflector 74 based on distance, propagation delay, or any other suitable criteria, such that the overall delay due to a failure in a node 14 or a link between the nodes 14 is kept below a pre-defined time limit. In addition, a node 14 is designated as a reflector 74 based on Quality of Service considerations for the traffic.

Node six, which is the reflector 74 for the first protection domain 70a, identifies itself as a reflector 74 based on the first segment 72a provided to node six. Because the node 14 that is subsequent to node six in the path for protection traffic corresponding to the first segment 72a is also downstream of node six, node six recognizes itself as a reflector 74. In contrast, for example, the node 14 that is subsequent to node seven in the first segment 72a is upstream of node seven. Thus, node seven recognizes that it is not a reflector 74.

In an alternative embodiment, node six may recognize itself as a reflector 74 by recognizing that the node 14 subsequent to node six in the protection path 72 is not a node 14 from which node six directly receives working traffic. For this embodiment, node seven recognizes that it is not a reflector 74 by recognizing that the node 14 subsequent to node seven in the protection path 72 is a node 14 from which node seven directly receives working traffic.

After recognizing itself as a reflector, node six is operable to generate a second segment 72b of the protection path 72 in a similar manner to the generation of the first segment 72a by the penultimate node 68. Node six identifies an upstream node 14 adjacent to node six. In the illustrated embodiment, this upstream node 14 is node five. Node six also identifies a downstream node 14 that is adjacent to node six. In the illustrated embodiment, this downstream node 14 is node seven. As a reflector 74, node six also designates a node 14 that is upstream of itself as a next reflector 74. In the illustrated embodiment, this next reflector 74 is node three.

For this embodiment, node six generates the second segment 72b of the protection path 72 by providing an order of nodes 14 corresponding to the path for protection traffic within the second protection domain 70b to each of those nodes 14. Thus, for the illustrated embodiment, the second segment 72b comprises node five, followed by node four, followed by node three and finally node seven. This order of nodes 14 is provided by the reflector 74, or node six, to the ordered nodes 14. Thus, the second segment 72b of the protection path 72 allows protection traffic to be routed from the second protection domain 70b to the first protection domain 70a when the working path 66 is unavailable at any point between node three and node six.

Similar to node six, node three as a reflector 74 generates a third segment 72c of the protection path 72 from node two, to node one, to the source node 62 and finally to node four. Thus, a complete protection path 72 is provided in a plurality of segments 72a, b and c, each of which corresponds to a protection domain 70a, b or c.

Figure 3:
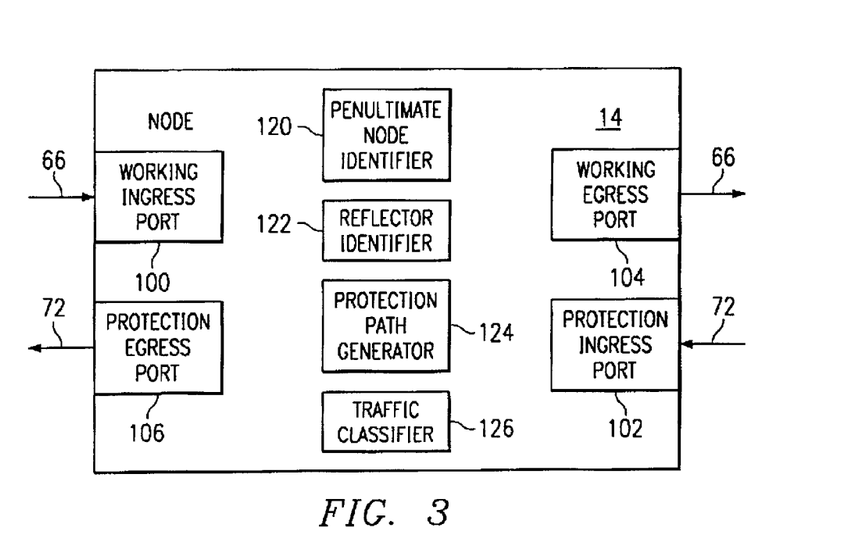
FIG. 3 is a block diagram illustrating one of the nodes of FIG. 2 operable to provide a protection path for connection-oriented signals in accordance with one embodiment of the present invention.

FIG. 3 is a block diagram illustrating one of the nodes 14 operable to provide a protection path 72 for connection-oriented signals in accordance with one embodiment of the present invention. The node 14 comprises one or more ingress ports 100 and 102 for receiving traffic, one or more egress ports 104 and 106 for transmitting traffic, a penultimate node identifier 120 for identifying the node 14 as a penultimate node 68, a reflector identifier 122 for identifying the node 14 as a reflector 74, a protection path generator 124 for generating a segment 72a, b or c of a protection path 72, and a traffic classifier 126 for classifying traffic received through an ingress port 100 or 102 as working traffic or protection traffic.

According to the illustrated embodiment, the ingress ports comprise a working ingress port 100 for receiving working traffic on the working path 66 and a protection ingress port 102 for receiving protection traffic on the protection path 72. Similarly, the egress ports comprise a working egress port 104 for transmitting working traffic on the working path 66 and a protection egress port 106 for transmitting protection traffic on the protection path 72. However, it will be understood that the node 14 may comprise one or more ingress ports 100 and 102, each of which may receive working and/or protection traffic. In addition, the node 14 may comprise one or more egress ports 104 and 106, each of which may transmit working and/or protection traffic.

The penultimate node identifier 120 is operable to identify the node 14 as a penultimate node 68 based on the working path 66 which indicates that the node 14 is operable to transmit working traffic directly to the destination node 64 along the working path 66. Thus, if the node 14 is operable to transmit working traffic directly to the destination node 64, the penultimate node identifier 120 notifies the node 14 of its status as the penultimate node 68. Otherwise, the node 14 recognizes that it is not the penultimate node 68.

The reflector identifier 122 is operable to identify the node 14 as a reflector 74 based on the protection path 72. Each node 14 in a segment 72a, b or c of a protection path 72 transmits protection traffic to a node 14 upstream of itself, except for a reflector 74 which transmits protection traffic downstream of itself to a node 14 in another protection domain 70. Thus, the reflector identifier 122 is operable to recognize that the node 14 in the protection path 72 subsequent to the node 14 comprising the reflector identifier 122 is downstream of that node 14. In this situation, the reflector identifier 122 notifies the node 14 of its status as a reflector 74. Otherwise, the node 14 recognizes that it is not a reflector 74.

The protection path generator 124 is operable to generate a segment 72a, b or c of a protection path 72. If the penultimate node identifier 120 has identified the node 14 as the penultimate node 68 or if the reflector identifier 122 has identified the node 14 as a reflector 74, the protection path generator 124 generates a segment 72a, b or c of the protection path 72, as described in more detail above in connection with FIG. 2.

The traffic classifier 126 is operable to classify traffic received at the node 14 as either working traffic or protection traffic. According to the illustrated embodiment, the traffic classifier 126 may classify traffic received at the working ingress port 100 as working traffic and traffic received at the protection ingress port 102 as protection traffic. In an alternative embodiment, both working and protection traffic may be received at a same ingress port 100 or 102. For this embodiment, the traffic may comprise a traffic identifier identifying itself as either working traffic or protection traffic. The traffic classifier 126 is then operable to classify the received traffic based on the traffic identifier for the traffic. It will be understood that the traffic classifier 126 may classify the traffic as working or protection traffic in any other suitable manner without departing from the scope of the present invention. Based on the classification of the traffic by the traffic classifier 126, the node 14 routes the working traffic along the working path 66 and protection traffic along the protection path 72.

Figure 4:
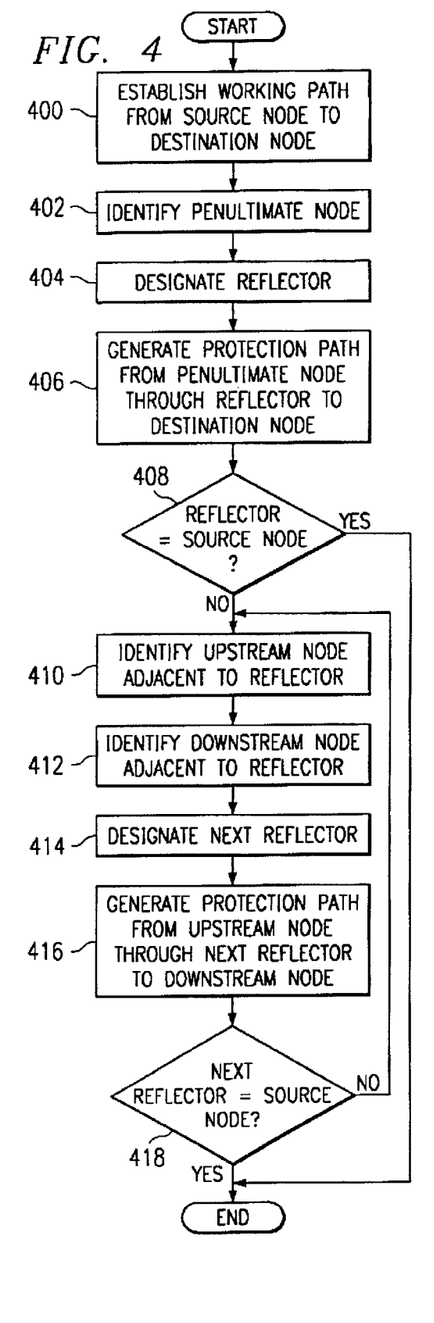
FIG. 4 is a flow diagram illustrating a method for providing a protection path for connection-oriented signals communicated between the nodes of FIG. 1 in accordance with one embodiment of the present invention.

FIG. 4 is a flow diagram illustrating a method for providing a protection path 72 for connection-oriented signals communicated between the nodes 14 in accordance with one embodiment of the present invention. The method begins at step 400 where a working path 66 is established from a source node 62 to a destination node 64.

At step 402, the penultimate node identifier 120 for the node 14 that transmits working traffic directly to the destination node 64 identifies the node 14 as the penultimate node 68. At step 404, the penultimate node 68 designates a node 14 as a reflector 74. At step 406, the penultimate node 68 generates a first segment 72a of a protection path 72 from the penultimate node 68 through the reflector 74 to the destination node 64.

At decisional step 408, a determination is made regarding whether the reflector 74 is the source node 62. If the reflector 74 is the source node 62, the entire protection path 72 has been generated and the method follows the Yes branch from decisional step 408 where it comes to an end. However, if the reflector 74 is not the source node 62, the method follows the No branch from decisional step 408 to step 410.

At step 410, the reflector 74 identifies the upstream node 14 adjacent to the reflector 74. At step 412, the reflector 74 identifies the downstream node 14 adjacent to the reflector 74. At step 414, the reflector 74 designates a node 14 as a next reflector 74. At step 416, the reflector 74 generates a second segment 72b of the protection path 72 from the upstream node 14 through the next reflector 74 to the downstream node 14.

At decisional step 418, a determination is made regarding whether the next reflector 74 is the source node 62. If the next reflector 74 is the source node 62, the entire protection path 72 has been generated and the method follows the Yes branch from decisional step 418 where it comes to an end. However, if the next reflector 74 is not the source node 62, the method follows the No branch from decisional step 418 and returns to step 410 to generate another segment of the protection path 72. Thus, the method continues until a next reflector 74 is the source node 62, indicating that the entire protection path 72 has been generated. In this way, a protection path 72 is provided that comprises a plurality of segments 72a, b and c such that processing delays and the amount of failure notification messages generated are substantially reduced, resulting in more timely and efficient communication of the signals. In addition, the protection path 72 is generated as a result of the working path 66 being established such that the protection path 72 is readily available should a failure occur, thereby reducing delays in responding to a failure.

Figure 5:
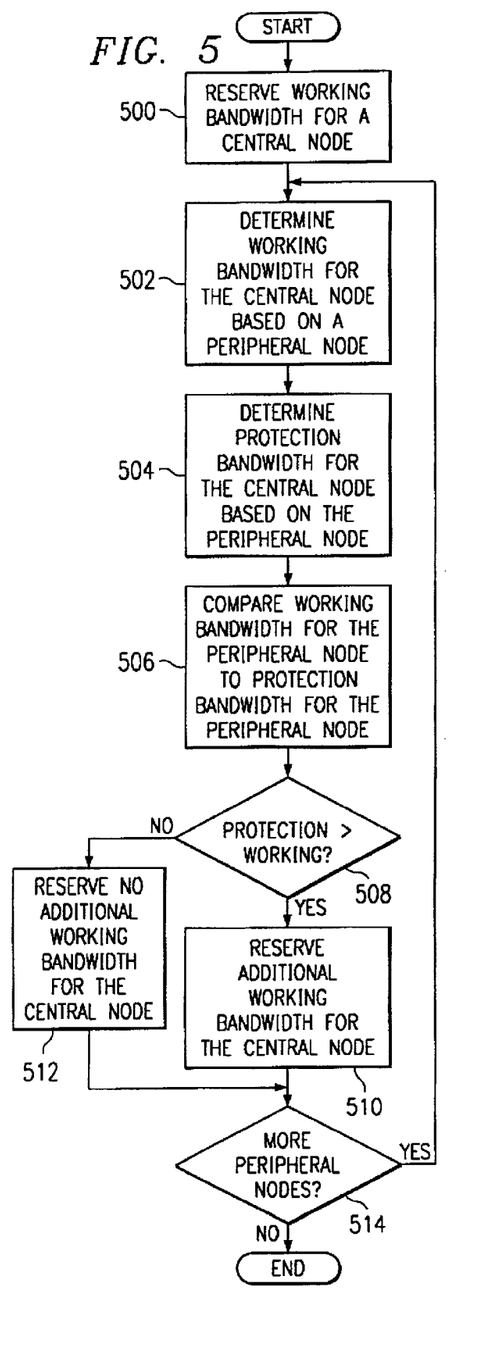
FIG. 5 is a flow diagram illustrating a method for reserving bandwidth for connection-oriented signals communicated between the nodes of FIG. 1 in accordance with one embodiment of the present invention.

FIG. 5 is a flow diagram illustrating a method for reserving bandwidth for connection-oriented signals communicated between the nodes 14 in accordance with one embodiment of the present invention. The method begins at step 500 where a working bandwidth for a central node is reserved. A central node comprises any node 14 operable to receive traffic from a plurality of peripheral nodes.

At step 502, working bandwidth is determined for the central node based on the amount of working traffic that may be received from a particular peripheral node, assuming that the corresponding working path 66 is available. At step 504, protection bandwidth is determined for the central node based on the amount of protection traffic that may be received from the peripheral node, assuming that the corresponding working path 66 is unavailable.

At step 506, the working bandwidth for the central node based on the working traffic from the peripheral node is compared to the protection bandwidth for the central node based on the protection traffic from the peripheral node. At decisional step 508, a determination is made regarding whether the protection bandwidth is greater than the working bandwidth. If the protection bandwidth is greater than the working bandwidth, the method follows the Yes branch from decisional step 508 to step 510. At step 510, additional working bandwidth is reserved for the central node in accordance with the difference between the protection bandwidth and the working bandwidth associated with the peripheral node.

Returning to decisional step 508, if the protection bandwidth is not greater than the working bandwidth, the method follows the No branch from decisional step 508 to step 512. At step 512, no additional working bandwidth is reserved for the central node based on the peripheral node.

From steps 510 and 512, the method continues to decisional step 514. At decisional step 514, a determination is made regarding whether there are more peripheral nodes that may contribute to the bandwidth requirement for the central node. If there are more peripheral nodes, the method follows the Yes branch from decisional step 514 and returns to step 502 in order to determine whether or not to reserve additional bandwidth for another peripheral node. However, if there are no more peripheral nodes, the method follows the No branch from decisional step 514 and comes to an end. In this way, bandwidth is reserved for the central node in accordance with the bandwidth requirements contributed by each of the peripheral nodes from which the central node receives traffic.

According to one embodiment, bandwidth is reserved for the protection path 72 to provide protection based on Quality of Service. The following notations are introduced to facilitate the discussion of this embodiment.

The set of all nodes 14 in the telecommunications network will be denoted as $N_T$. Each node 14 can be expressed as $I_x$ where x is the index of the set $N_T$. The count of this set is $C(N_T)$.

The set of all unidirectional links in the telecommunications network will be denoted as $L_T$. Each member of $L_T$ will be represented as $l_i$, with i being the index of the set $L_T$. The count of this set is $C(L_T)$.

Bandwidth reservation involves a determination of the required link bandwidth for protection purposes, expressed as $P_{l_x}$ for any link $l_x$ inside the network. In determining protection bandwidth reservation for a link $l_x$, traffic from other links and nodes 14 onto link $l_x$ are considered, as discussed below.

For any working link $l_y$ inside the network that sends working traffic onto link $l_x$, the bandwidth for this portion of the traffic on link $l_x$ is expressed as $B_w(l_y/l_x)$ (bandwidth of the working traffic from $l_y$ to $l_x$). If link $l_y$ is broken, such traffic disappears.

For any broken link $l_y$ inside the network, bandwidth for the protection traffic directed onto link $l_x$ due to the broken status of link $l_y$ is expressed as $B_p(l_y/l_x)$.

For any working node $I_y$ inside the network that sends working traffic onto link $l_x$, the bandwidth for this portion of the traffic on link $l_x$ is expressed as $B_w(I_y/l_x)$ (bandwidth of the working traffic from node $I_y$ to $l_x$). If node $I_y$ is broken, such traffic disappears.

For any broken node $I_y$ inside the network, bandwidth for the protection traffic directed onto link $l_x$ due to the broken status of node $I_y$ is expressed as $B_p(I_y/l_x)$.

Thus, for protecting against a failure on link $l_y$, the protection bandwidth on link $l_x$, expressed as $P_{l_x}(l_y)$, is given by:

$$P_{l_x}(l_y) = \max(0, B_p(l_y/l_x) - B_w(l_y/l_x)) \quad \text{(eqn. 1)}$$

Similarly, for protecting against a failure on node $I_y$, the protection bandwidth on link $l_x$, expressed as $P_{l_x}(I_y)$, is given by:

$$P_{l_x}(I_y) = \max(0, B_p(I_y/l_x) - B_w(I_y/l_x)) \quad \text{(eqn. 2)}$$

Thus, an array can be established by considering each link and node 14 inside the network as follows:

$$[P_{l_x}(l_1), \ldots, P_{l_x}(l_{C(L_T)}), P_{l_x}(I_1), \ldots, P_{l_x}(I_{C(N_T)})] \quad \text{(eqn. 3)}$$

The array expressed in equation 3 can be numerically sorted and expressed as $\{p_1, p_2, \ldots, p_n\}$ with $p_1 \geq p_2 \geq \ldots \geq p_n$ and $n = C(L_T) + C(N_T)$. For a single failure inside the network, the amount of bandwidth required for protection purposes is:

$$P_{l_x} = p_1 \quad \text{(eqn. 4)}$$

For M failures, the amount of the bandwidth required for protection purposes is:

$$P_{l_x} = \left(\sum_{j=1}^{M} p_j\right) \quad \text{(eqn.5)}$$

Based on equation 3, it is also possible to specify a set of multiple failures for protection, depending on the protection policy (based on the importance of protecting certain links over others). Thus, this reservation mechanism minimizes the amount of bandwidth to be reserved for protection purposes.

Although the present invention has been described with several embodiments, various changes and modifications may be suggested to one skilled in the art. It is intended that the present invention encompasses such changes and modifications as fall within the scope of the appended claims.

What is claimed is:

1. A system for providing a protection path for connection-oriented signals in a telecommunications network comprising a plurality of nodes, the system comprising:
   a source node operable to transmit traffic;
   a destination node operable to receive traffic from the source node; and
   a penultimate node operable to receive traffic from the source node, to transmit traffic directly to the destination node, to designate one of the nodes as a reflector and to generate a first segment of a protection path from the penultimate node through the reflector to the destination node.

2. The system of claim 1, the reflector operable to receive traffic, to identify the traffic as working traffic or protection traffic, to transmit the working traffic to a node downstream of the reflector and to transmit the protection traffic to the destination node.

3. The system of claim 2, the reflector further operable to transmit the protection traffic directly to the destination node.

4. The system of claim 2, the reflector further operable to designate one of the nodes as a next reflector and to generate a second segment of the protection path from a node upstream of the reflector through the next reflector to a node downstream of the reflector.

5. The system of claim 4, the next reflector operable to receive traffic, to identify the traffic as working traffic or protection traffic, to transmit the working traffic to a node downstream of the next reflector and to transmit the protection traffic to the node downstream of the reflector.

6. The system of claim 5, the reflector further operable to transmit the protection traffic directly to the destination node, and the next reflector further operable to transmit the protection traffic directly to the node downstream of the reflector.

7. The system of claim 4, the source node comprising the next reflector.

8. The system of claim 1, the plurality of nodes comprising a plurality of inner nodes operable to transmit traffic between the source node and the reflector and between the reflector and the destination node, each of the inner nodes operable to receive traffic, to identify the traffic as working traffic or protection traffic, to transmit the working traffic to a node downstream of the inner node, and to transmit the protection traffic to a node upstream of the inner node.

9. The system of claim 1, the source node comprising the reflector.

10. The system of claim 1, the penultimate node further operable to designate one of the nodes as a reflector based on Quality of Service for the traffic.

11. A node in a telecommunications network, comprising:
    an ingress port operable to receive working traffic on a working path and protection traffic on a protection path;
    a reflector identifier operable to identify the node as a reflector based on the received traffic;
    a protection path generator operable to generate a protection path based on an identification of the node as a reflector;

a penultimate node identifier operable to identify the node as a penultimate node based on the received traffic and based on a determination that the node is operable to transmit working traffic directly to a destination node to which the node is coupled, the protection path generator further operable to generate a protection path based on the identification of the node as a penultimate node; and an egress port operable to transmit traffic.

12. The node of claim 11, further comprising a traffic classifier operable to classify received traffic as working traffic or protection traffic.

13. The node of claim 12, the traffic comprising a traffic identifier, the traffic classifier further operable to classify received traffic as working traffic or protection traffic based on the traffic identifier for the traffic.

14. The node of claim 12, the egress port further operable to transmit working traffic based on the received working path and to transmit protection traffic based on the received protection path.

15. The node of claim 12, the ingress port comprising a plurality of ports and the egress port comprising a plurality of ports.

16. The node of claim 15, the ingress port comprising a working ingress port and a protection ingress port and the egress port comprising a working egress port and a protection egress port, the traffic classifier further operable to identify traffic received through the working ingress port as working traffic and traffic received through the protection ingress port as protection traffic, the working egress port operable to transmit working traffic and the protection egress port operable to transmit protection traffic.

17. The node of claim 11, the node coupled to a plurality of nodes, the reflector identifier operable to identify the node as a reflector based on the received protection path comprising a node downstream of the node subsequent to the node.

18. The node of claim 11, the reflector identifier further operable to identify the node as a reflector based on Quality of Service for the traffic.

19. A method for providing a protection path for connection-oriented signals in a telecommunications network comprising a plurality of nodes, the method comprising:

identifying a source node operable to transmit traffic;

identifying a destination node operable to receive traffic from the source node;

identifying a penultimate node operable to transmit traffic directly to the destination node;

designating one of the nodes as a reflector; and generating a first segment of a protection path from the penultimate node through the reflector to the destination node.

20. The method of claim 19, further comprising:

identifying the traffic received at the penultimate node as working traffic or protection traffic;

transmitting the working traffic received at the penultimate node directly from the penultimate node to the destination node;

identifying the traffic received at the reflector as working traffic or protection traffic; and transmitting the protection traffic received at the reflector directly from the reflector to the destination node.

21. The method of claim 19, the source node comprising the reflector.

22. The method of claim 19, further comprising:

designating one of the nodes as a next reflector; and generating a second segment of the protection path from a node upstream of the reflector through the next reflector to a node downstream of the reflector.

23. The method of claim 22, further comprising:

identifying the traffic received at the penultimate node as working traffic or protection traffic;

transmitting the working traffic received at the penultimate node directly from the penultimate node to the destination node;

identifying the traffic received at the reflector as working traffic or protection traffic;

transmitting the protection traffic received at the reflector directly from the reflector to the destination node;

identifying the traffic received at the next reflector as working traffic or protection traffic; and transmitting the protection traffic received at the next reflector directly from the next reflector to the node downstream of the reflector.

24. The method of claim 22, the source node comprising the next reflector.

25. The method of claim 22, designating one of the nodes as a reflector comprising designating one of the nodes as a reflector based on Quality of Service for the traffic.

* * * * *